US012638795B2

(12) United States Patent
Kuge et al.

(10) Patent No.: US 12,638,795 B2
(45) Date of Patent: May 26, 2026

(54) ROTATION DEVICE, FIXING DEVICE, AND IMAGE FORMING APPARATUS

(71) Applicant: FUJIFILM Business Innovation Corp., Tokyo (JP)

(72) Inventors: Hideki Kuge, Kanagawa (JP); Takayuki Ukawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/315,861

(22) Filed: May 11, 2023

(65) Prior Publication Data

US 2024/0168419 A1 May 23, 2024

(30) Foreign Application Priority Data

Nov. 22, 2022 (JP) ................................ 2022-186482

(51) Int. Cl.
*G03G 15/20* (2006.01)
*G03G 15/00* (2006.01)

(52) U.S. Cl.
CPC ..... *G03G 15/2053* (2013.01); *G03G 15/5008* (2013.01); *G03G 2215/2058* (2013.01)

(58) Field of Classification Search
CPC ...................... G03G 15/2053; G03G 15/5008
USPC .......................................... 399/69, 320, 328
See application file for complete search history.

(56) References Cited

U.S. PATENT DOCUMENTS

| | | | | |
|---|---|---|---|---|
| 8,364,051 B2 * | 1/2013 | Sakaya | G03G 15/2039 399/69 |
| 8,718,521 B2 * | 5/2014 | Chiba | G03G 15/1615 399/304 |
| 10,268,149 B2 * | 4/2019 | Kudo | G03G 15/2053 |

FOREIGN PATENT DOCUMENTS

| | | |
|---|---|---|
| JP | 2011-184189 A | 9/2011 |
| JP | 2012-078756 A | 4/2012 |
| JP | 2012-078775 A | 4/2012 |
| JP | 2012128075 * | 7/2012 |
| JP | 2012-220812 A | 11/2012 |

* cited by examiner

*Primary Examiner* — Hoan H Tran
(74) *Attorney, Agent, or Firm* — Sughrue Mion, PLLC

(57) ABSTRACT

A rotation device includes: a first rotator that includes a recessed portion formed on an outer circumferential surface and that is rotatable in a predetermined rotation direction; a second rotator that comes into contact with a portion of the outer circumferential surface in a range from an upstream end to a downstream end of the recessed portion in the rotation direction and that is separated from the first rotator outward in a radial direction of the first rotator when the first rotator is in a position of rotation such that the recessed portion faces the second rotator; a first drive mechanism that rotates the first rotator or the second rotator and that causes the other of the first rotator or the second rotator to rotate in conjunction in a contact state in which the first rotator and the second rotator are in contact with each other; and a second drive mechanism that rotates the other in a separation state in which the first rotator and the second rotator are separated from each other.

11 Claims, 9 Drawing Sheets

ROTATION DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2022-186482 filed Nov. 22, 2022.

BACKGROUND

(i) Technical Field

The present disclosure relates to a rotation device, a fixing device, and an image forming apparatus.

(ii) Related Art

Japanese Unexamined Patent Application Publication No. 2011-184189 discloses a medium transport apparatus including an impression cylinder and a contact member, the impression cylinder is cylindrical, rotates about a central axis to transport a medium that is supported on a circumferential surface, includes a fixation member that fixes an edge portion of the medium in a transport direction over the entire width of the medium that is supported on the circumferential surface in a direction substantially perpendicular to the transport direction, and includes cam portions that are disposed outside both ends of the fixation member in the direction substantially perpendicular to the transport direction and that protrude from the circumferential surface to positions higher than that of the fixation member, the contact member has a length greater than a distance between the cam portions in the direction substantially perpendicular to the transport direction, is urged so as to come into contact with the medium that is supported on the circumferential surface of the impression cylinder, and rides on the cam portions so as not to come into contact with the fixation member, the impression cylinder includes a first magnetic field generator that generates a predetermined magnetic field at least at positions on the circumferential surface at which the contact member rises on the cam portions, and the contact member includes a second magnetic field generator that generates a magnetic field for producing repulsive force against the magnetic field that is generated by the first magnetic field generator.

Japanese Unexamined Patent Application Publication No. 2012-220812 discloses a transfer device including a belt-like image carrier that carries an image, a drive roller that moves the image carrier that carries the image with the image carrier wound around the drive roller, a first tension roller that applies tensile force to the image carrier with the image carrier that is moved by the drive roller wound around the first tension roller, a first elastic support portion that includes a first elastic member for producing the tensile force and that supports an end of the rotation shaft of the first tension roller, a second elastic support portion that includes a second elastic member for producing the tensile force and that supports the other end of the rotation shaft of the first tension roller, a backup roller around which the image carrier that is wound around the tension roller is wound, a transfer roller that includes a recessed portion on a circumferential surface, that comes into contact with the image carrier that is wound around the backup roller, and that forms a transfer nip, and a second tension roller that applies tensile force to the image carrier with the image carrier that is wound around the backup roller is wound around the second tension roller.

Japanese Unexamined Patent Application Publication No. 2012-78756 discloses a fixing device including two fixing rotation members that rotate with the fixing rotation members pressed against each other and that heat and press a recording material carrying an unfixed toner image to fix the unfixed toner image when the recording material passes through a position at which the fixing rotation members are pressed against each other, a drive component that rotates one of the two fixing rotation members, a contact-separation component that causes the two fixing rotation members to be pressed against each other or to be separated from each other, and a driving force transmitting component that transmits rotational driving force of the fixing rotation member including the drive component to the other fixing rotation member when the contact-separation component causes the fixing rotation members to be separated from each other.

SUMMARY

It is thought that a rotation device includes a first rotator that includes a recessed portion formed on an outer circumferential surface and that is rotatable in a predetermined rotation direction, a second rotator that comes into contact with a portion of the outer circumferential surface in a range from an upstream end to a downstream end of the recessed portion in the rotation direction and that is separated from the first rotator outward in a radial direction of the first rotator when the first rotator is in a position of rotation such that the recessed portion faces the second rotator, and a drive mechanism that rotates the first rotator or the second rotator and that causes the other of the first rotator or the second rotator to rotate in conjunction in a contact state in which the first rotator and the second rotator are in contact with each other.

As for the rotation device, in the case where only rotational force that is transmitted from the first rotator or the second rotator to the other is used to rotate the other in the contact state in which the first rotator and the second rotator are in contact with each other, the rotational speed of the other decreases in a separation state in which the first rotator and the second rotator are separated from each other.

Aspects of non-limiting embodiments of the present disclosure relate to the case where rotational force is transmitted from a first rotator or a second rotator to the other of the first rotator or the second rotator in a contact state in which the first rotator and the second rotator are in contact with each other, and the rotational speed of the other is inhibited from decreasing in a separation state in which the first rotator and the second rotator are separated from each other, unlike the case where only the rotational force is used to rotate the other.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a rotation device including a first rotator that includes a recessed portion formed on an outer circumferential surface and that is rotatable in a predetermined rotation direction; a second rotator that comes into contact with a portion of the outer circumferential surface in a range from an upstream end to a downstream end of the recessed portion in the rotation direction and that is separated from the first rotator outward in a radial direction of the first rotator when the first rotator is in a position of rotation such that the recessed portion faces the second rotator; a first drive mechanism that rotates the first rotator or the second rotator and that causes the other of the first rotator or the second rotator to rotate in conjunction in a contact state in which the first rotator and the second rotator are in contact with each other; and a second drive mechanism that rotates the other in a separation state in which the first rotator and the second rotator are separated from each other.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will hereinafter be described by way of example with reference to the figures.

Image Forming Apparatus 10

Figure 1:
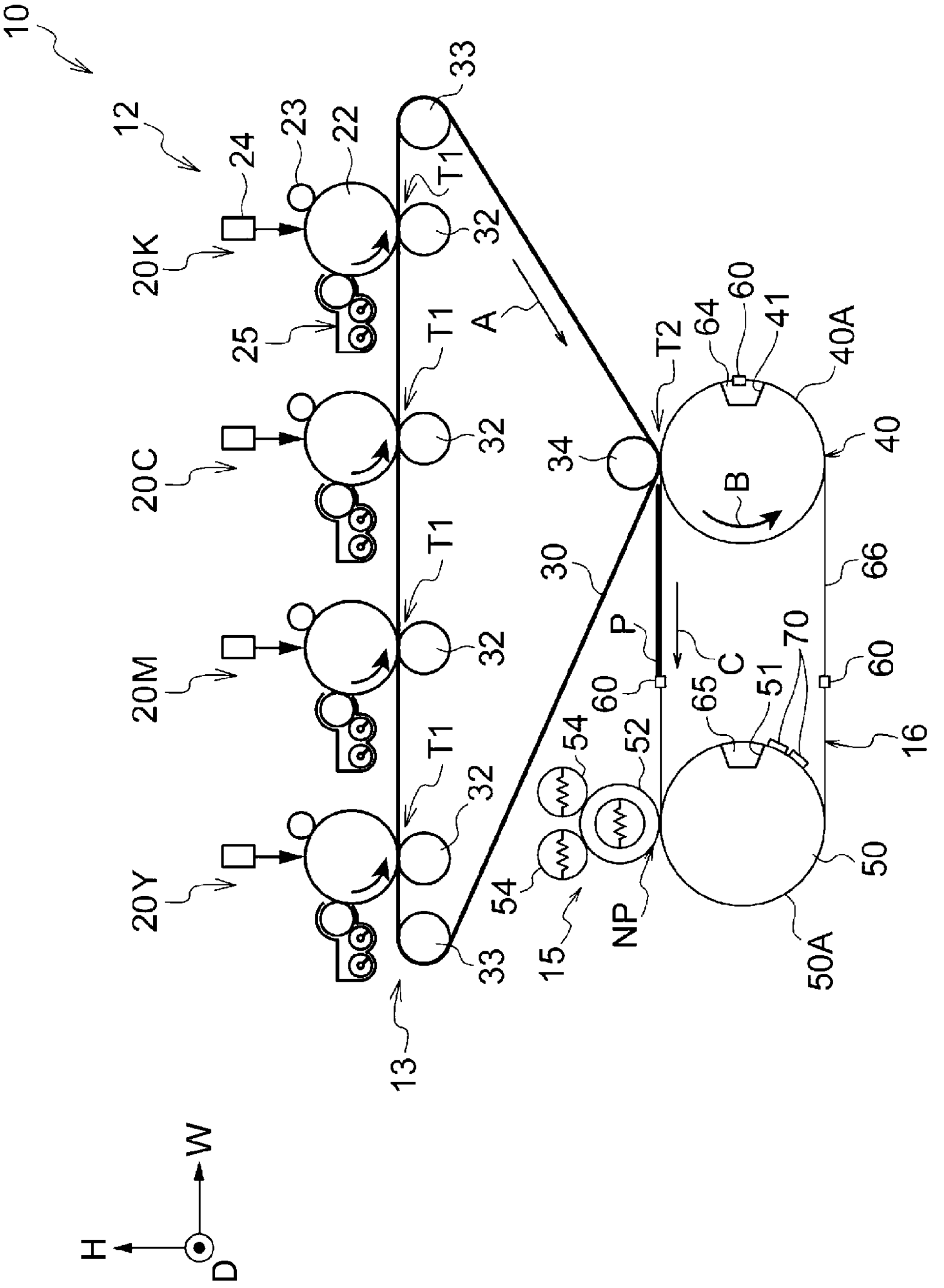
FIG. 1 schematically illustrates an image forming apparatus according to the present exemplary embodiment.

The structure of an image forming apparatus 10 according to the present exemplary embodiment will be described. FIG. 1 schematically illustrates the structure of the image forming apparatus 10 according to the present exemplary embodiment. In the figures, an arrow H represents the vertical direction and an up-down direction of the apparatus, an arrow W represents the horizontal direction and a width direction of the apparatus, and an arrow D represents the horizontal direction and a depth direction of the apparatus (a front-rear direction of the apparatus). Ratios of the dimensions of components illustrated in the figures in the H direction, the W direction, and the D direction differ from actual ratios of the dimensions in some cases.

The image forming apparatus 10 illustrated in FIG. 1 forms toner images (examples of an image) on a recording medium P. Specifically, the image forming apparatus 10 includes an image forming unit 12, a fixing device 15, and a transport mechanism 16. The components (the image forming unit 12, the fixing device 15, and the transport mechanism 16) of the image forming apparatus 10 will now be described.

Image Forming Unit 12

The image forming unit 12 forms the toner images on the recording medium P by using an electrophotographic system. Specifically, as illustrated in FIG. 1, the image forming unit 12 includes toner image forming units 20 that form the toner images and a transfer device 13 that transfers the toner images that are formed by the toner image forming units 20 to the recording medium P.

Toner Image Forming Units 20

The multiple toner image forming units 20 illustrated in FIG. 1 form the toner images in colors. According to the present exemplary embodiment, the toner image forming units 20 for four colors of yellow (Y), magenta (M), cyan (C), and black (K) in total are provided. Symbols of (Y), (M), (C), and (K) illustrated in FIG. 1 represent components for the respective colors described above.

The toner image forming units 20 for the respective colors have the same structure except for toner to be used. Accordingly, the components of the toner image forming unit 20(K) as a representative of the toner image forming units 20 for the respective colors are designated by reference characters in FIG. 1.

Specifically, the toner image forming units 20 for the respective colors include photoconductor members 22 that rotate in a direction (for example, a counterclockwise direction in FIG. 1). The toner image forming units 20 for the respective colors also include chargers 23, exposure devices 24, and developing devices 25.

As for the toner image forming units 20 for the respective colors, the chargers 23 charge the photoconductor members 22. The exposure devices 24 expose the photoconductor members 22 that are charged by the chargers 23 to light and form electrostatic latent images on the photoconductor members 22. The developing devices 25 develop the electrostatic latent images that are formed on the photoconductor members 22 by using the exposure devices 24 and form the toner images.

Transfer Device 13

The transfer device 13 illustrated in FIG. 1 transfers the toner images that are formed by the toner image forming units 20 to the recording medium P. Specifically, the transfer device 13 performs first transfer by which the toner images on the photoconductor members 22 for the respective colors are stacked on a transfer belt 30 that serves as an intermediate transfer body and second transfer by which the stacked toner images are transferred to the recording medium P. As illustrated in FIG. 1, the transfer device 13 includes the transfer belt 30, first transfer rollers 32, and a transfer cylinder 40.

The first transfer rollers 32 transfer the toner images on the photoconductor members 22 for the respective colors to the transfer belt 30 at first transfer positions T1 between the photoconductor members 22 and the first transfer rollers 32. According to the present exemplary embodiment, a first transfer electric field is applied between the first transfer rollers 32 and the photoconductor members 22, and the toner images that are formed on the photoconductor members 22 are consequently transferred to the transfer belt 30 at the first transfer positions T1.

The toner images on the photoconductor members 22 for the respective colors are transferred to an outer circumferential surface of the transfer belt 30. As illustrated in FIG. 1, the transfer belt 30 has no ends and is wound around multiple rollers 33 and a facing roller 34 so as to have an inverted triangle shape in a front view (when viewed in the depth direction of the apparatus). At least one of the multiple rollers 33 is rotated, and the transfer belt 30 consequently turns in the direction of an arrow A.

Figure 2:
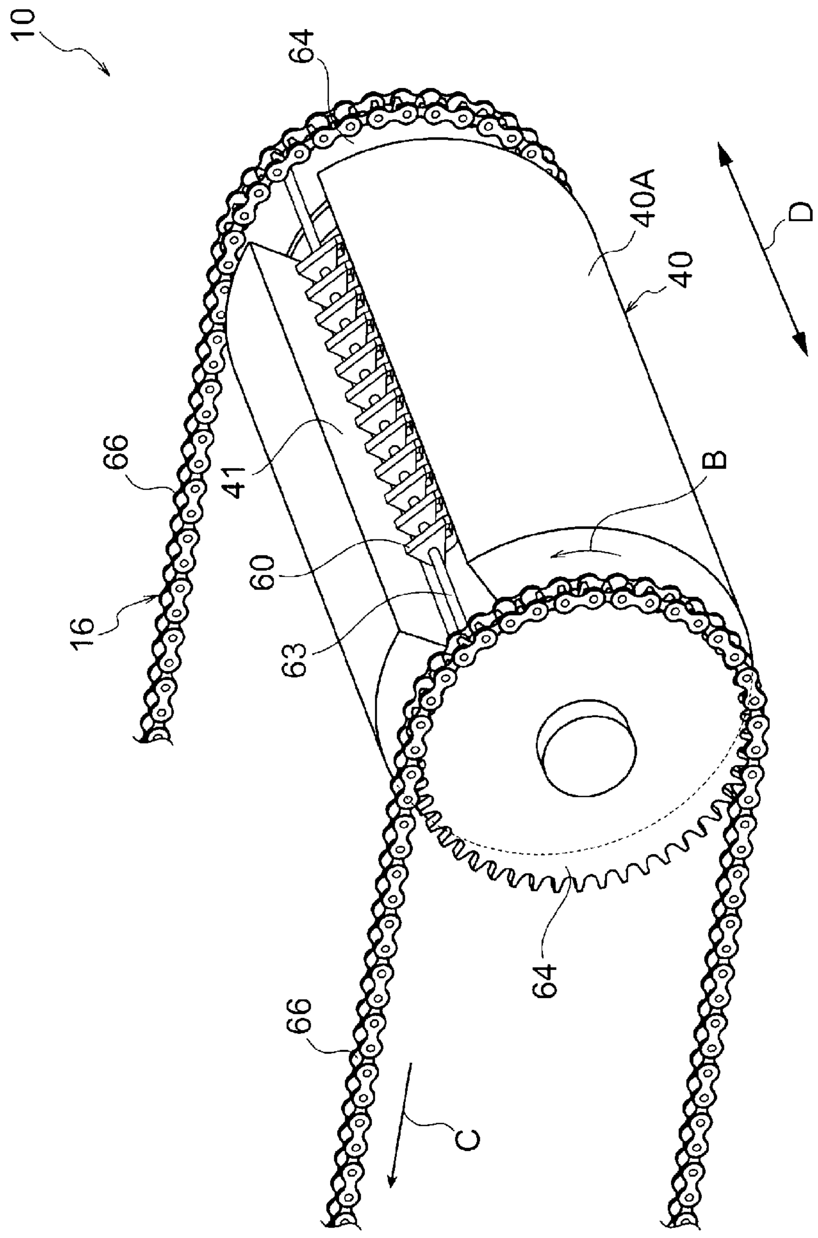
FIG. 2 is a perspective view of the structure of the vicinity of a transfer cylinder according to the present exemplary embodiment.

As illustrated in FIG. 1 and FIG. 2, the transfer cylinder 40 includes a recessed portion 41 that is formed on an outer circumferential surface 40A and rotates in a rotation direction B. The recessed portion 41 is elongated in the axial direction of the transfer cylinder 40 and has a depth in a radial direction of the transfer cylinder 40.

As illustrated in FIG. 1, the transfer cylinder 40 is disposed below the transfer belt 30 and faces the transfer belt 30. As for the transfer cylinder 40, a portion of the outer circumferential surface 40A in a range from an upstream end to a downstream end of the recessed portion 41 in the rotation direction comes into contact with the transfer belt 30.

As illustrated in FIG. 2, two sprockets 64 are disposed at both ends of the transfer cylinder 40 in the axial direction. The two sprockets 64 are disposed coaxially with the transfer cylinder 40. A cylinder body is rotated in the rotation direction B by using a drive unit (not illustrated), and the transfer cylinder 40 consequently rotates in the rotation direction B together with the two sprockets 64.

According to the present exemplary embodiment, the transfer belt 30 and the transfer cylinder 40 transport the recording medium P with the recording medium P interposed therebetween at a second transfer position T2 (see FIG. 1). A second transfer electric field is applied between the facing roller 34 and the transfer cylinder 40, and the toner images that are transferred to the transfer belt 30 are consequently transferred to the recording medium P at the second transfer position T2. Grippers 60 and mount members 63 described later hold the recording medium P and are contained in the recessed portion 41 when passing through the second transfer position T2 so as not to come into contact with the transfer belt 30.

Fixing Device 15

Figure 5:
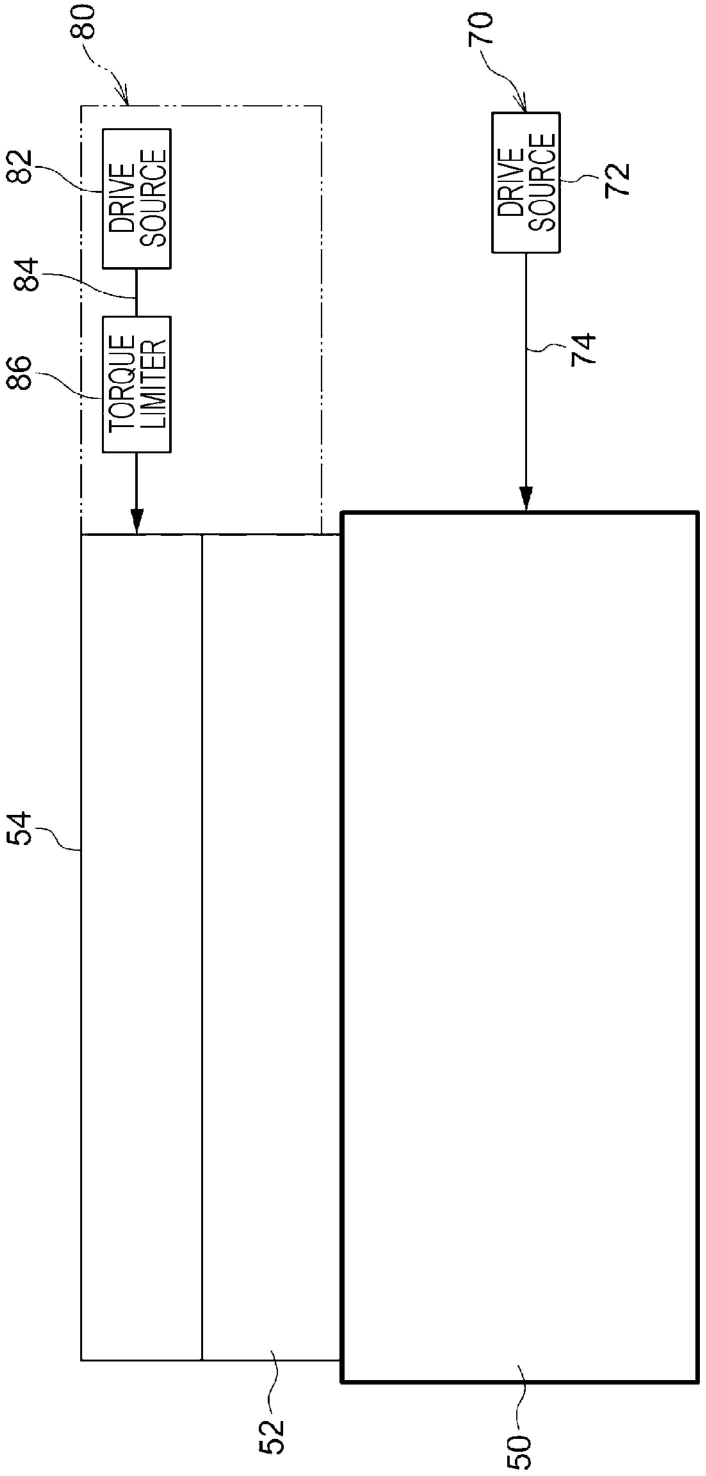
FIG. 5 is a side view of the fixing cylinder, a heat roller, a pair of external heat rollers, a first drive mechanism, and a second drive mechanism according to the present exemplary embodiment.
Figure 6:
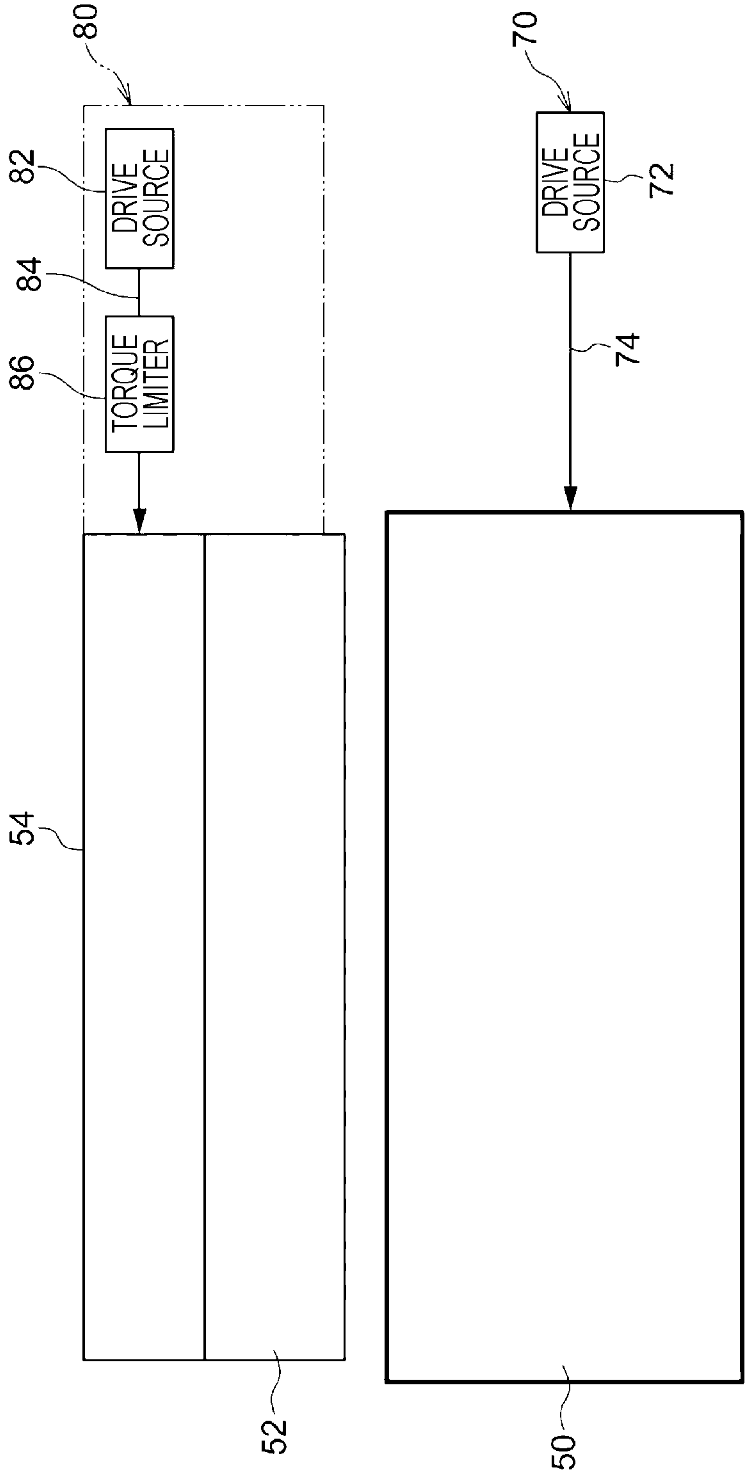
FIG. 6 is a side view of the structure illustrated in FIG. 5 in a separation state in which the fixing cylinder and the heat roller are separated from each other.

According to the present exemplary embodiment, the fixing device 15 fixes the toner images that are transferred to the recording medium P by using the transfer cylinder 40 to the recording medium P. Specifically, as illustrated in FIG. 1, the fixing device 15 includes a fixing cylinder 50, a heat roller 52, and a pair of external heat rollers 54. As illustrated in FIG. 5 and FIG. 6, the fixing device 15 also includes a first drive mechanism 70 and a second drive mechanism 80. The fixing cylinder 50 is an example of a first rotator. The heat roller 52 is an example of a second rotator.

Figure 7:
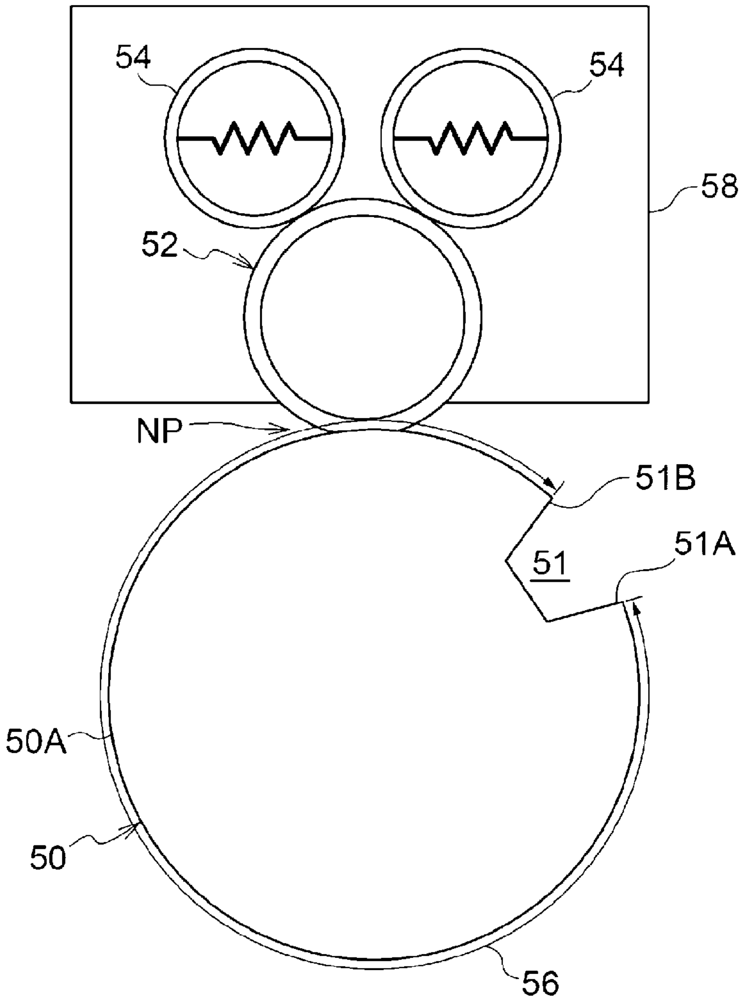
FIG. 7 schematically illustrates the fixing cylinder, the heat roller, and the pair of external heat rollers according to the present exemplary embodiment.
Figure 8:
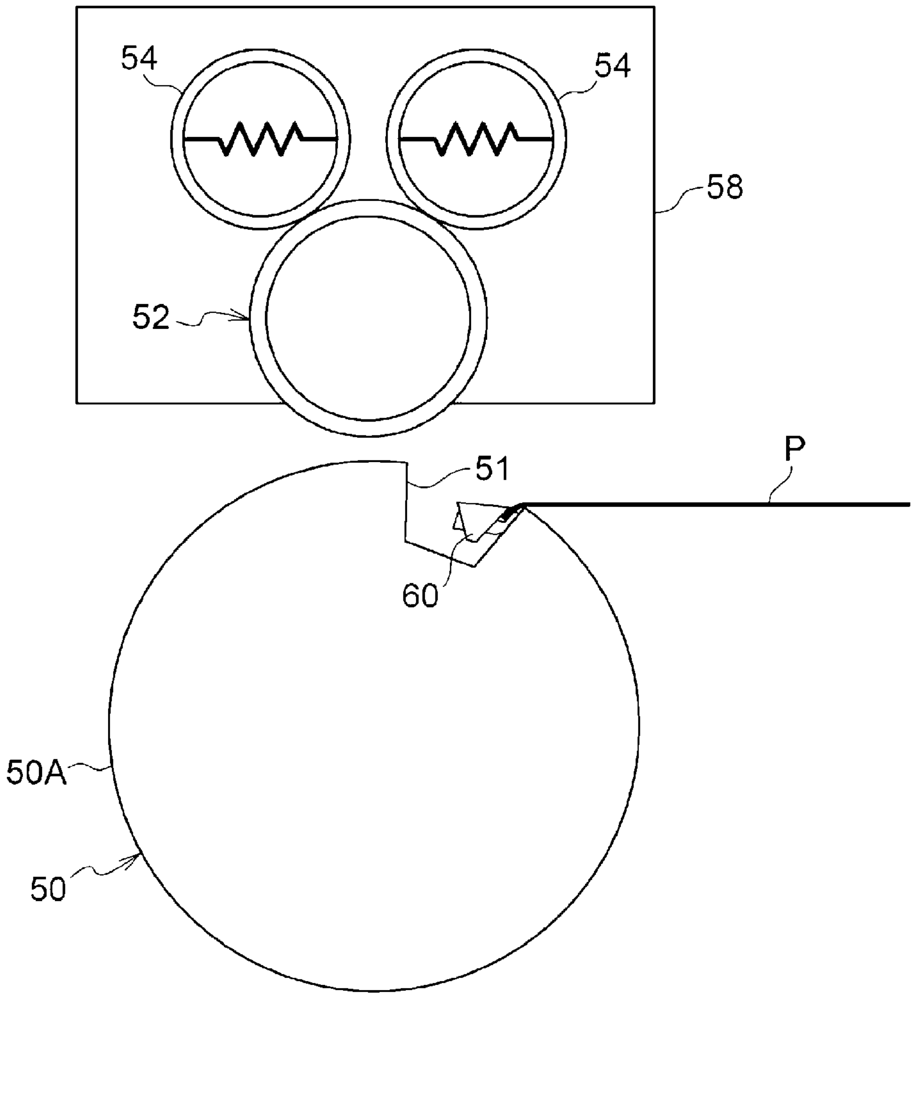
FIG. 8 schematically illustrates the structure illustrated in FIG. 7 in the separation state in which the fixing cylinder and the heat roller are separated from each other.
Figure 9:
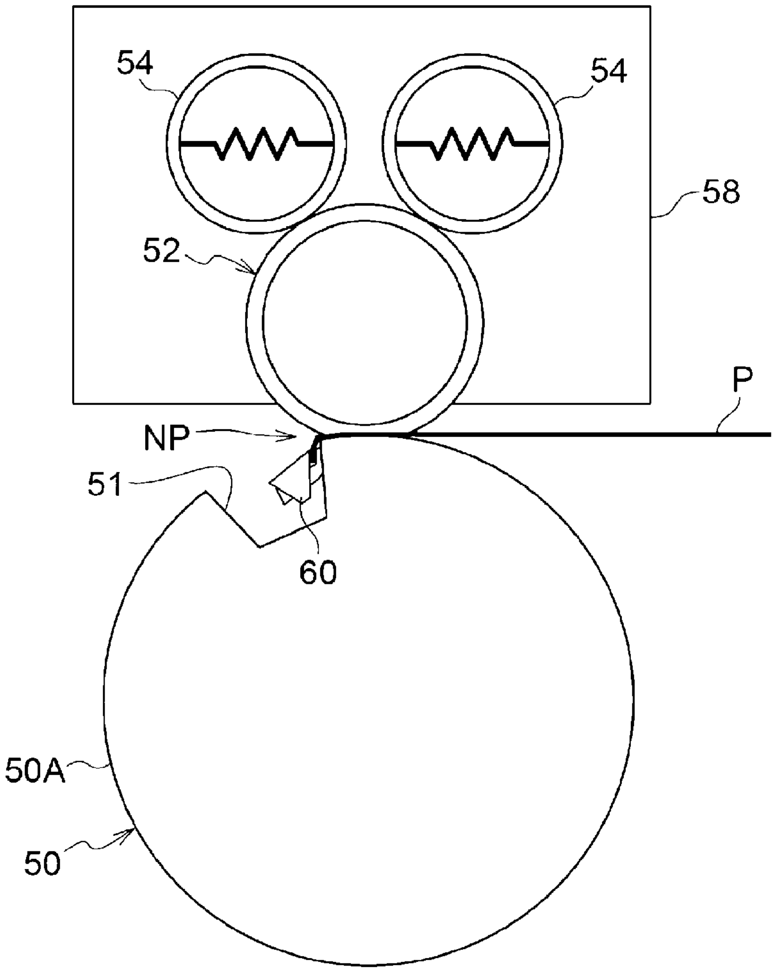
FIG. 9 schematically illustrates the structure illustrated in FIG. 7 in a state in which a recording medium is interposed between the fixing cylinder and the heat roller.

As for the fixing device 15, as illustrated in FIG. 7, FIG. 8, and FIG. 9, the heat roller 52 is disposed above the fixing cylinder 50. The fixing cylinder 50 is heavier than the heat roller 52. The heat roller 52 is in contact with the pair of external heat rollers 54 and is heated by the pair of external heat rollers 54.

The fixing cylinder 50 includes a recessed portion 51 that is formed on an outer circumferential surface 50A and is caused to rotate by the first drive mechanism 70 (see FIG. 5 and FIG. 6) in a rotation direction. The rotation direction is an example of a predetermined rotation direction. The recessed portion 51 is formed on a portion of the outer circumferential surface of the fixing cylinder 50 in a circumferential direction. The recessed portion 51 is elongated in the axial direction of the fixing cylinder 50 and has a depth in the radial direction of the fixing cylinder 50. The grippers 60 and the mount members 63 described later are contained in the recessed portion 51. Consequently, the grippers 60 and the mount members 63 do not come into contact with the heat roller 52 when passing through a fixing position NP.

Figure 3:
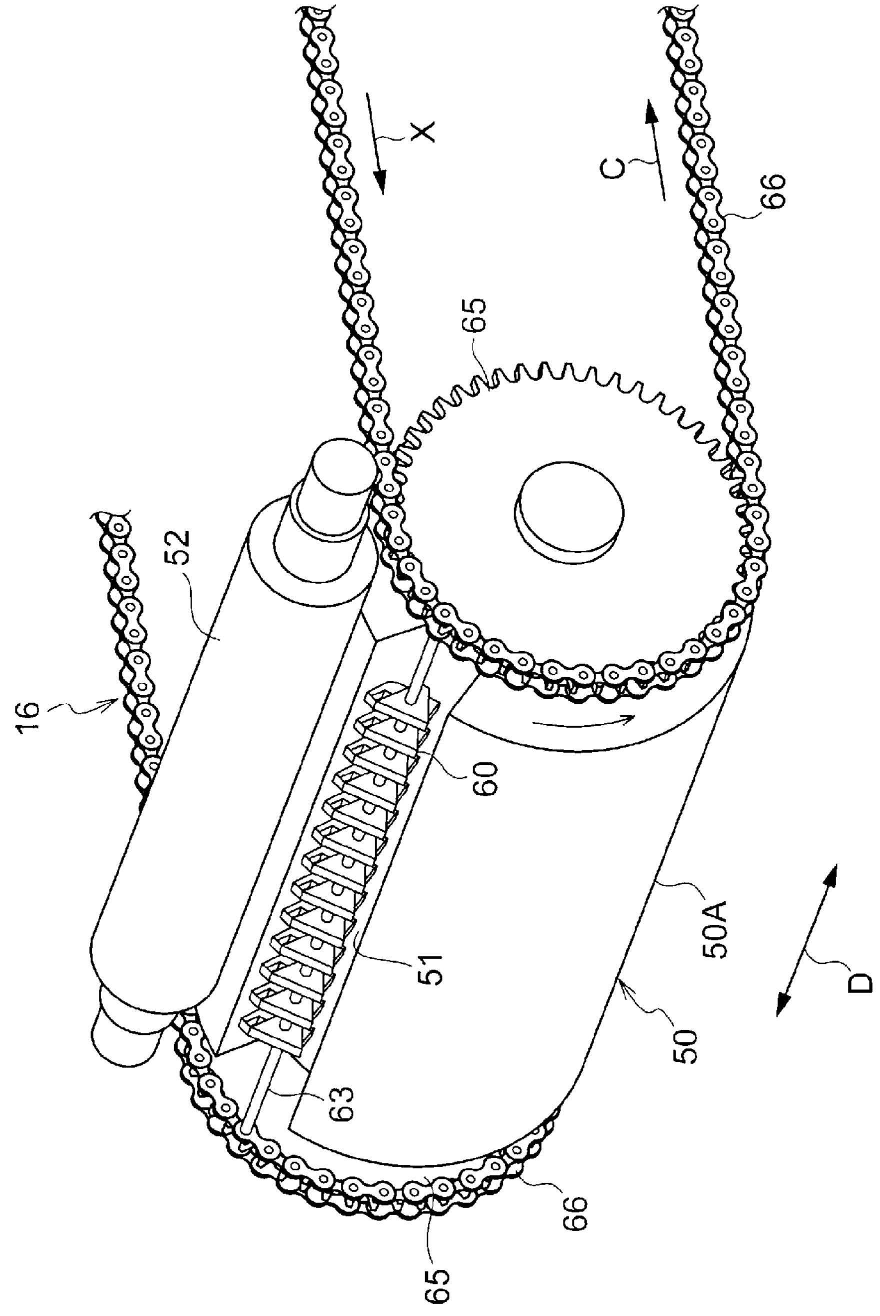
FIG. 3 is a perspective view of the structure of the vicinity of a fixing cylinder according to the present exemplary embodiment.

As illustrated in FIG. 3, two sprockets 65 are disposed at both ends of the fixing cylinder 50 in the axial direction. The two sprockets 65 are disposed coaxially with the fixing cylinder 50. The fixing cylinder 50 is rotated in the rotation direction by using the first drive mechanism 70 (see FIG. 5 and FIG. 6) and consequently rotates in the rotation direction together with the two sprockets 65.

The heat roller 52 is movable between a position of contact (a position illustrated in FIG. 7) and a position of separation (a position illustrated in FIG. 8) with respect to the fixing cylinder 50. According to the present exemplary embodiment, the heat roller 52 and the pair of external heat rollers 54 are supported by a support 58, and a movement mechanism that includes, for example, a cam causes the heat roller 52 to move together with the pair of external heat rollers 54 to the position of contact (the position illustrated in FIG. 7) and the position of separation (the position illustrated in FIG. 8).

When the fixing cylinder 50 is in a position of rotation such that a contact range 56 (see FIG. 7) faces the heat roller 52, the movement mechanism causes the heat roller 52 to be located at the position of contact. At the position of contact, the heat roller 52 and the fixing cylinder 50 are in contact with each other (referred to below as a contact state). The contact range 56 (see FIG. 7) is the range of a portion of the outer circumferential surface 50A in a range from an upstream end 51A to a downstream end 51B of the recessed portion 51. The contact state may not always occur whenever the fixing cylinder 50 is in the position of rotation such that the contact range 56 (see FIG. 7) faces the heat roller 52.

When the fixing cylinder 50 is in a position of rotation such that the recessed portion 51 faces the heat roller 52, the movement mechanism causes the heat roller 52 to be located at the position of separation. At the position of separation, the heat roller 52 and the fixing cylinder 50 are separated from each other (referred to below as a separation state). The separation state may not always occur whenever the fixing cylinder 50 is in the position of rotation such that the recessed portion 51 faces the heat roller 52.

The heat roller 52 is in contact with the portion in the contact range 56 in the contact state, and the recording medium P is interposed between the heat roller 52 and the fixing cylinder 50 as illustrated in FIG. 9. It is not necessary for the heat roller 52 to come into contact with the portion over the entire contact range 56, provided that the heat roller 52 comes into contact with the portion at least in a part of the contact range 56.

The fixing device 15 transports the recording medium P with the recording medium P interposed between the heat roller 52 and the fixing cylinder 50 at the fixing position NP, heats and presses the recording medium P, and fixes the toner images that are transferred to the recording medium P to the recording medium P. The first drive mechanism 70 and the second drive mechanism 80 will be described later.

Transport Mechanism 16

The transport mechanism 16 illustrated in FIG. 1 transports the recording medium P. As illustrated in FIG. 1 and FIG. 2, the transport mechanism 16 includes two chains 66 and the grippers 60 that are examples of a holding member. In FIG. 1, one of the two chains 66 is illustrated, and an illustration of the chain 66 and the grippers 60 is simplified.

As illustrated in FIG. 1, the two chains 66 are annular. As illustrated in FIG. 2, the two chains 66 are arranged at an interval in the depth direction (the direction of the arrow D in the figure) of the apparatus. The two chains 66 are wound around the respective sprockets 64 that are disposed at both ends of the transfer cylinder 40 in the axial direction and the respective sprockets 65 (see FIG. 3) that are disposed at both ends of the fixing cylinder 50 in the axial direction. The transfer cylinder 40 and the two sprockets 64 are rotated in the rotation direction B (the direction of an arrow B) together, and the chains 66 consequently turn in a circumferential direction C (the direction of an arrow C).

As illustrated in FIG. 2, the mount members 63 on which the grippers 60 are mounted extend between the two chains 66 in the depth direction of the apparatus. The multiple mount members 63 are fixed to the two chains 66 at a predetermined interval in the circumferential direction C in which the chains 66 turn.

Figure 4:
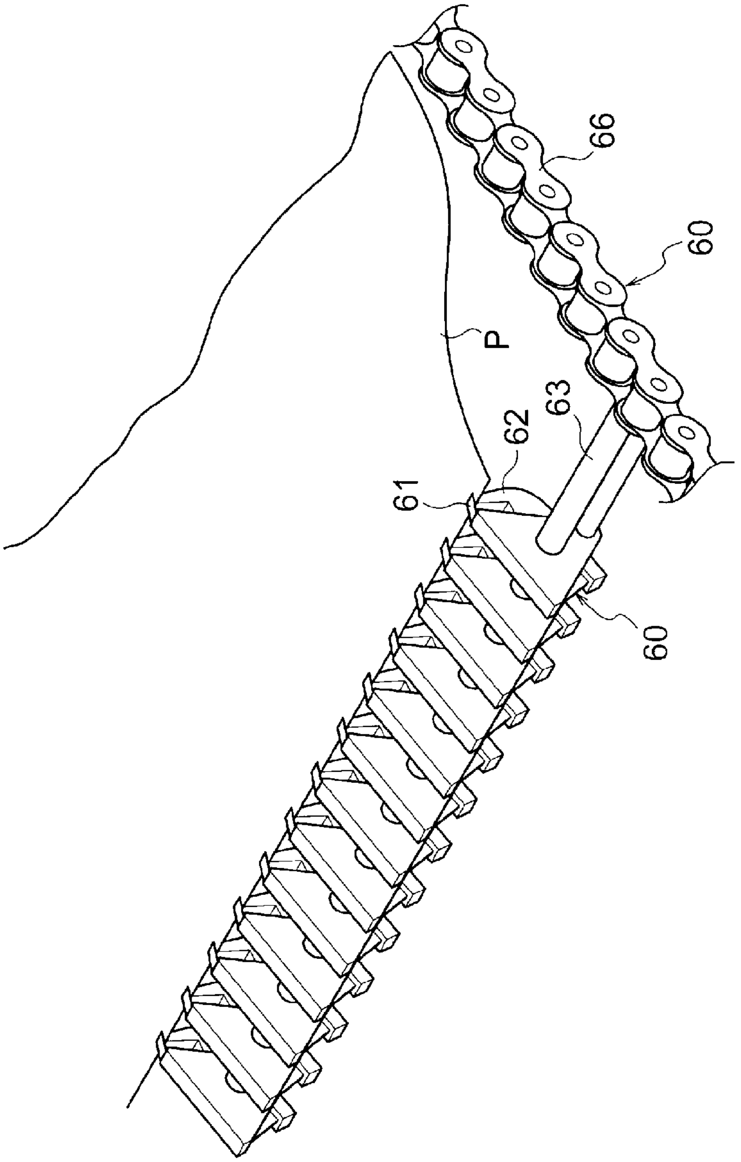
FIG. 4 is a perspective view of grippers according to the present exemplary embodiment.

As illustrated in FIG. 2, the multiple grippers 60 are mounted on the mount members 63 at a predetermined interval in the depth direction of the apparatus. The grippers 60 function as the holding member that holds a leading edge portion of the recording medium P. Specifically, as illustrated in FIG. 4, each gripper 60 includes a pawl 61 and a pawl base 62. The gripper 60 holds the recording medium P by interposing the leading edge portion of the recording medium P between the pawl 61 and the pawl base 62. As for the gripper 60, for example, the pawl 61 is pressed against the pawl base 62 by using, for example, a spring, and the pawl 61 opens or closes with respect to the pawl base 62 by using, for example, a cam action.

As for the transport mechanism 16, as illustrated in FIG. 4, the grippers 60 hold the leading edge portion of the recording medium P that is fed from a container unit (not illustrated) that contains the recording medium P. The chains 66 turn in the circumferential direction C, and the grippers 60 that hold the leading edge portion of the recording medium P consequently transport the recording medium P and pass through the second transfer position T2 and the fixing position NP. The toner images that are stacked on and first-transferred to the transfer belt 30 at the first transfer positions T1 for the respective colors are second-transferred to the recording medium P at the second transfer position T2.

The chains 66 turn in the circumferential direction C, the grippers 60 that hold the leading edge portion of the recording medium P consequently transport the recording medium P and pass through the fixing position NP. At the fixing position NP, the recording medium P that is held by the grippers 60 is located on the outer circumferential surface 50A of the fixing cylinder 50 in the contact range 56 described later.

The recording medium P that is located on the outer circumferential surface 50A of the fixing cylinder 50 in the contact range 56 described later is interposed between the heat roller 52 and the fixing cylinder 50, and the images on the recording medium P are fixed to the recording medium.

The grippers 60 are contained in the recessed portion 41 that is formed on the outer circumferential surface of the transfer cylinder 40 together with the mount members 63 when passing through the second transfer position T2 and are contained in the recessed portion 51 that is formed on the outer circumferential surface of the fixing cylinder 50 together with the mount members 63 when passing through the fixing position NP.

First Drive Mechanism 70 and Second Drive Mechanism 80

The first drive mechanism 70 illustrated in FIG. 5 and FIG. 6 rotates the fixing cylinder 50 and causes the heat roller 52 to rotate in conjunction in the contact state in which the fixing cylinder 50 and the heat roller 52 are in contact with each other. As illustrated in FIG. 5 and FIG. 6, the first drive mechanism 70 includes a drive source 72 that includes a drive motor by way of example, and a transmitter 74 that transmits the driving force of the drive source 72 to the fixing cylinder 50. For example, the transmitter 74 includes mechanical factors such as a gear, a coupling, a belt, and a pulley.

The second drive mechanism 80 illustrated in FIG. 5 and FIG. 6 rotates the heat roller 52 in the separation state in which the fixing cylinder 50 and the heat roller 52 are separated from each other. As illustrated in FIG. 5 and FIG. 6, the second drive mechanism 80 includes a drive source 82 that includes a drive motor by way of example, and a transmitter 84 that transmits the driving force of the drive source 82 to the heat roller 52. For example, the transmitter 84 includes mechanical factors such as a gear, a coupling, a belt, and a pulley and the pair of external heat rollers 54. The pair of external heat rollers 54 is an example of a third rotator.

According to the present exemplary embodiment, the pair of external heat rollers 54 rotates with the pair of external heat rollers 54 being in contact with the heat roller 52 and causes the heat roller 52 to rotate in conjunction. The pair of external heat rollers 54 moves together with the heat roller 52 that comes into contact with or is separated from the fixing cylinder 50 with the pair of external heat rollers 54 being in contact with the heat roller 52 as described above. According to the present exemplary embodiment, the pair of external heat rollers 54 that causes the heat roller 52 to rotate in conjunction heats the heat roller 52 in this way.

As for the second drive mechanism 80, the drive source 82 produces driving force in the contact state in which the fixing cylinder 50 and the heat roller 52 are in contact with each other and in the separation state in which the fixing cylinder 50 and the heat roller 52 are separated from each other, and a torque limiter 86 restricts the driving force that is transmitted to the heat roller 52 in the contact state. The torque limiter 86 is disposed on a transmission path of the transmitter 84.

In the case where torque from the fixing cylinder 50 to the heat roller 52 increases in the contact state, the torque limiter 86 intercepts transmission of the driving force of the drive source 82 to the heat roller 52. The torque limiter 86 is an example of a restriction unit and an example of an interception unit.

The second drive mechanism 80 is supported by the support 58 together with the heat roller 52 and the pair of external heat rollers 54 and moves between a position of contact (a position illustrated in FIG. 5) and a position of separation (a position illustrated in FIG. 6) together with the heat roller 52 and the pair of external heat rollers 54.

Actions According to Present Exemplary Embodiment

According to the present exemplary embodiment, the second drive mechanism 80 rotates the heat roller 52 in the separation state in which the fixing cylinder 50 and the heat roller 52 are separated from each other as described above.

In this way, the recording medium P may be inhibited from wrinkling, the images may be inhibited from being misaligned, and fixing the images to the recording medium P is inhibited from failing even when the heat roller 52 comes into contact with the fixing cylinder 50 again, and the images are fixed. In this way, an image failure may be inhibited from occurring.

According to the present exemplary embodiment, the drive source 82 produces the driving force in the contact state in which the fixing cylinder 50 and the heat roller 52 are in contact with each other and in the separation state in which the fixing cylinder 50 and the heat roller 52 are separated from each other, and the torque limiter 86 restricts the driving force that is transmitted to the heat roller 52 in the contact state.

In this way, the rotational speed of the fixing cylinder 50 may be inhibited from varying in the contact state, unlike the case where the driving force that is transmitted to the heat roller 52 is constant in the contact state in which the fixing cylinder 50 and the heat roller 52 are in contact with each other and in the separation state in which the fixing cylinder 50 and the heat roller 52 are separated from each other. In this way, vibrations may be reduced, and the images may be inhibited from being misaligned.

According to the present exemplary embodiment, specifically, the torque limiter 86 intercepts transmission of the driving force of the drive source 82 to the heat roller 52 in the contact state.

In this way, the rotational speed of the fixing cylinder 50 may be inhibited from varying in the contact state, unlike the case where the driving force that is transmitted to the heat roller 52 is decreased in the contact state.

The first drive mechanism 70 rotates the fixing cylinder 50 and causes the heat roller 52 to rotate in conjunction in the contact state in which the fixing cylinder 50 and the heat roller 52 are in contact with each other.

In this way, the fixing cylinder 50 may be inhibited from failing to rotate even when the mass (that is, moment of inertia) of the fixing cylinder 50 is greater than the mass (that is, moment of inertia) of the heat roller 52, unlike the case where the first drive mechanism rotates the heat roller 52 and causes the fixing cylinder 50 to rotate in conjunction.

According to the present exemplary embodiment, the pair of external heat rollers 54 rotates with the pair of external heat rollers 54 being in contact with the heat roller 52, and the heat roller 52 consequently rotate in conjunction.

In this way, the structure of the vicinity of the rotation axis of the heat roller 52 may be simplified because a mechanism for inputting the driving force into the rotation axis of the heat roller 52 is not needed, unlike the case where the second drive mechanism 80 directly rotates the heat roller 52.

According to the present exemplary embodiment, the pair of external heat rollers 54 moves with the pair of external heat rollers 54 being in contact with the heat roller 52 together with the heat roller 52 that comes into contact with or is separated from the fixing cylinder 50 as described above.

According to the present exemplary embodiment, the pair of external heat rollers 54 that causes the heat roller 52 to rotate in conjunction heats the heat roller 52.

In this way, the number of components may be smaller than that in the case where another heating component that differs from the rollers that cause the heat roller 52 to rotate in conjunction heats the heat roller 52.

According to the present exemplary embodiment, the grippers 60 and the mount members 63 are contained in the recessed portion 51 of the fixing cylinder 50.

Modifications to First Rotator, Second Rotator, and Third Rotator

According to the present exemplary embodiment, the fixing cylinder 50 is used as an example of the first rotator, but this is not a limitation. Examples of the first rotator may include the transfer cylinder 40, a transfer roller, and a transport roller.

According to the present exemplary embodiment, the heat roller 52 is used as an example of the second rotator, but this is not a limitation. Examples of the second rotator may include a transfer roller and a transport roller.

According to the present exemplary embodiment, the pair of external heat rollers 54 is used as an example of the third rotator, but this is not a limitation. Examples of the third rotator may include a roller that does not involve heat generation.

Other Modifications

According to the present exemplary embodiment, the first drive mechanism 70 rotates the fixing cylinder 50 and causes the heat roller 52 to rotate in conjunction in the contact state in which the fixing cylinder 50 and the heat roller 52 are in contact with each other, but this is not a limitation. For example, the first drive mechanism may rotate the heat roller 52 and may cause the fixing cylinder 50 to rotate in conjunction in the contact state in which the fixing cylinder 50 and the heat roller 52 are in contact with each other. In this case, the second drive mechanism 80 rotates the fixing cylinder 50 in the separation state in which the fixing cylinder 50 and the heat roller 52 are separated from each other.

According to the present exemplary embodiment, the drive source 82 produces the driving force in the contact state in which the fixing cylinder 50 and the heat roller 52 are in contact with each other and in the separation state in which the fixing cylinder 50 and the heat roller 52 are separated from each other, and the torque limiter 86 restricts the driving force that is transmitted to the heat roller 52 in the contact state, but this is not a limitation. The driving force that is transmitted to the heat roller 52 may be constant in the contact state in which the fixing cylinder 50 and the heat roller 52 are in contact with each other and in the separation state in which the fixing cylinder 50 and the heat roller 52 are separated from each other.

According to the present exemplary embodiment, the torque limiter 86 intercepts transmission of the driving force of the drive source 82 to the heat roller 52 in the contact state, but this is not a limitation. For example, the driving force that is transmitted to the heat roller 52 may be decreased in the contact state. This may be achieved, for example, in a manner in which the drive (specifically, the output) of the drive source 72 is controlled.

According to the present exemplary embodiment, the pair of external heat rollers 54 rotates with the pair of external heat rollers 54 being in contact with the heat roller 52, and the heat roller 52 consequently rotate in conjunction, but this is not a limitation. For example, the second drive mechanism 80 may directly rotate the heat roller 52.

According to the present exemplary embodiment, the pair of external heat rollers 54 moves with the pair of external heat rollers 54 being in contact with the heat roller 52 together with the heat roller 52 that comes into contact with or is separated from the fixing cylinder 50 as described above, but this is not a limitation. The pair of external heat rollers 54 may be separated from the heat roller 52 that comes into contact or that is separated.

According to the present exemplary embodiment, the pair of external heat rollers 54 that causes the heat roller 52 to rotate in conjunction heats the heat roller 52, but this is not a limitation. For example, another heating component that differs from the rollers that cause the heat roller 52 to rotate in conjunction may heat the heat roller 52.

According to the present exemplary embodiment, the grippers 60 and the mount members 63 are contained in the recessed portion 51 of the fixing cylinder 50, but this is not a limitation. The recessed portion 51 may be provided for another purpose.

The present disclosure is not limited to the exemplary embodiment described above, and various modifications, alterations, and improvements may be made without departing from the spirit thereof. For example, the multiple modifications described above may be appropriately combined.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A rotation device includes: a first rotator that includes a recessed portion formed on an outer circumferential surface and that is rotatable in a predetermined rotation direction, a second rotator that comes into contact with a portion of the outer circumferential surface in a range from an upstream end to a downstream end of the recessed portion in the rotation direction and that is separated from the first rotator outward in a radial direction of the first rotator when the first rotator is in a position of rotation such that the recessed portion faces the second rotator, a first drive mechanism that rotates the first rotator or the second rotator and that causes the other of the first rotator or the second rotator to rotate in conjunction in a contact state in which the first rotator and the second rotator are in contact with each other, and a second drive mechanism that rotates the other in a separation state in which the first rotator and the second rotator are separated from each other.

(((2)))

As for the rotation device described in (((1))), the second drive mechanism produces driving force in the contact state, produces driving force in the separation state, and includes a restriction unit that restricts the driving force that is transmitted to the other in the contact state.

(((3)))

As for the rotation device described in (((2))), the restriction unit is an interception unit that intercepts transmission of the driving force to the other in the contact state.

(((4)))

As for the rotation device described in any one of (((1))) to (((3))), the first drive mechanism rotates the first rotator and causes the second rotator to rotate in conjunction in the contact state, and the second drive mechanism rotates the second rotator in the separation state.

(((5)))

As for the rotation device described in any one of (((1))) to (((4))), the second drive mechanism includes a third rotator that rotates with the third rotator being in contact with the second rotator and that causes the second rotator to rotate in conjunction.

(((6)))

As for the rotation device described in (((5))), the third rotator moves with the third rotator being in contact with the second rotator together with the second rotator that comes into contact or that is separated.

(((7)))

As for the rotation device described in (((1))) or (((6))), the third rotator heats the second rotator.

(((8)))

As for the rotation device described in any one of (((1))) to (((7))), the recessed portion contains a holding member that holds a recording medium.

(((9)))

A fixing device that serves as the rotation device described in (((7))), a recording medium is interposed between the first rotator and the second rotator, and an image on the recording medium is fixed to the recording medium.

(((10)))

An image forming apparatus includes: an image forming unit that forms an image on the recording medium; and the fixing device described in (((9))) that fixes the image that is formed by the image forming unit to the recording medium.

What is claimed is:

1. A rotation device comprising:

a first rotator that includes a recessed portion formed on an outer circumferential surface and that is rotatable in a predetermined rotation direction;

a second rotator that comes into contact with a portion of the outer circumferential surface in a range from an upstream end to a downstream end of the recessed portion in the rotation direction and that is separated from the first rotator outward in a radial direction of the first rotator when the first rotator is in a position of rotation such that the recessed portion faces the second rotator;

a first drive mechanism that rotates the first rotator or the second rotator and that causes the other of the first rotator or the second rotator to rotate in conjunction in a contact state in which the first rotator and the second rotator are in contact with each other; and a second drive mechanism that rotates the other in a separation state in which the first rotator and the second rotator are separated from each other.

2. The rotation device according to claim 1, wherein the second drive mechanism produces driving force in the contact state, produces driving force in the separation state, and includes a restriction unit that restricts the driving force that is transmitted to the other in the contact state.

3. The rotation device according to claim 2, wherein the restriction unit is an interception unit that intercepts transmission of the driving force to the other in the contact state.

4. The rotation device according to claim 1, wherein the first drive mechanism rotates the first rotator and causes the second rotator to rotate in conjunction in the contact state, and wherein the second drive mechanism rotates the second rotator in the separation state.

5. The rotation device according to claim 4, wherein the second drive mechanism includes a third rotator that rotates with the third rotator being in contact with the second rotator and that causes the second rotator to rotate in conjunction.

6. The rotation device according to claim 5, wherein the third rotator moves with the third rotator being in contact with the second rotator together with the second rotator that comes into contact or that is separated.

7. The rotation device according to claim 5, wherein the third rotator heats the second rotator.

8. The rotation device according to claim 1, wherein the recessed portion contains a holding member that holds a recording medium.

9. A fixing device that serves as the rotation device according to claim 7, wherein a recording medium is interposed between the first rotator and the second rotator, and an image on the recording medium is fixed to the recording medium.

10. An image forming apparatus comprising:

an image forming unit that forms an image on the recording medium; and the fixing device according to claim 9 that fixes the image that is formed by the image forming unit to the recording medium.

11. A rotation device comprising:

a first rotator that includes a recessed portion formed on an outer circumferential surface and that is rotatable in a predetermined rotation direction;

a second rotator that comes into contact with a portion of the outer circumferential surface in a range from an upstream end to a downstream end of the recessed portion in the rotation direction and that is separated from the first rotator outward in a radial direction of the first rotator when the first rotator is in a position of rotation such that the recessed portion faces the second rotator;

means for rotating the first rotator or the second rotator and for causing the other of the first rotator or the second rotator to rotate in conjunction in a contact state in which the first rotator and the second rotator are in contact with each other; and means for rotating the other in a separation state in which the first rotator and the second rotator are separated from each other.

* * * * *